United States Patent
Walker

(10) Patent No.: US 11,293,478 B2
(45) Date of Patent: Apr. 5, 2022

(54) CARABINER

(71) Applicant: TruBlue LLC, Boulder, CO (US)

(72) Inventor: Ryan Daniel Walker, Broomfield, CO (US)

(73) Assignee: TruBlue LLC, Louisville, CO (US)

(*) Notice: Subject to any disclaimer, the term of this patent is extended or adjusted under 35 U.S.C. 154(b) by 0 days.

(21) Appl. No.: 17/089,242

(22) Filed: Nov. 4, 2020

(65) Prior Publication Data

US 2021/0131481 A1 May 6, 2021

Related U.S. Application Data

(60) Provisional application No. 62/989,401, filed on Mar. 13, 2020, provisional application No. 62/930,779, filed on Nov. 5, 2019.

(51) Int. Cl.
*F16B 45/02* (2006.01)

(52) U.S. Cl.
CPC .................... *F16B 45/02* (2013.01)

(58) Field of Classification Search
CPC .... F16B 45/002; F16B 45/024; F16B 45/028; F16B 45/023; F16B 45/02; Y10T 24/45366; Y10T 24/4755; Y10T 24/45319; Y10T 24/45335; Y10T 24/45356; Y10T 24/4534; Y10T 24/45346; Y10T 24/45351; Y10T 24/45361; Y10T 24/45372
See application file for complete search history.

(56) References Cited

U.S. PATENT DOCUMENTS

| | | |
|---|---|---|
| 245,893 A | 8/1881 | Tunnington |
| 370,983 A | 10/1887 | Stahl |
| 479,524 A | 7/1892 | Nicholson |
| 546,084 A | 9/1895 | Webb |
| 547,528 A | 10/1895 | Weaver et al. |
| 654,687 A | 7/1900 | Suter |
| 926,156 A | 6/1909 | Waterhouse et al. |
| 1,087,062 A | 2/1914 | Izett |
| 1,087,063 A | 2/1914 | Izett |
| 1,228,694 A | 6/1917 | Netcott |
| 1,371,619 A | 3/1921 | Greenstreet |

(Continued)

FOREIGN PATENT DOCUMENTS

| | | |
|---|---|---|
| DE | 4237263 | 7/1994 |
| EP | 0131384 | 1/1985 |

(Continued)

OTHER PUBLICATIONS

PCT International Search Report and Written Opinion in International Application PCT/US2018/016475, dated Apr. 16, 2018, 16 pages.

(Continued)

*Primary Examiner* — Robert Sandy
(74) *Attorney, Agent, or Firm* — Merchant & Gould P.C.

(57) ABSTRACT

A carabiner includes a swivel loop and a body rotatably coupled to the swivel loop about a rotational axis. The body includes a spine having a spine axis that intersects the rotational axis at an intersection point disposed within the connection between the swivel loop and the body. The carabiner also includes a captive eye formed completely within the spine. The body and the captive eye being both rotatable relative to swivel loop.

19 Claims, 11 Drawing Sheets

(56) References Cited

U.S. PATENT DOCUMENTS

| | | |
|---|---|---|
| 1,490,619 A | 4/1924 | Manikowske et al. |
| 1,576,352 A | 3/1926 | Nordling |
| 1,873,196 A | 8/1932 | Harris et al. |
| 1,935,711 A | 11/1933 | Hecox |
| 1,958,877 A | 5/1934 | Yake |
| 2,229,935 A | 1/1941 | Powers |
| 2,812,010 A | 11/1957 | Abdallah |
| 3,040,678 A | 6/1962 | McEwen |
| 3,070,035 A | 12/1962 | Russo et al. |
| 3,192,872 A | 7/1965 | Parent |
| 3,194,598 A * | 7/1965 | Goldfuss ............... B66C 1/36 294/82.19 |
| 3,398,714 A | 8/1968 | Wallin et al. |
| 3,480,272 A | 11/1969 | Ziebart |
| 3,759,190 A | 9/1973 | Harvey |
| 4,062,293 A | 12/1977 | Davis |
| 4,159,113 A | 6/1979 | Callecod |
| 4,440,432 A | 4/1984 | Goris |
| 4,528,728 A * | 7/1985 | Schmidt ............... F16B 45/02 24/599.4 |
| 4,621,851 A | 11/1986 | Bailey, Jr. |
| 4,721,268 A | 1/1988 | Lerner et al. |
| 4,892,508 A | 1/1990 | Ryan |
| 4,948,118 A | 8/1990 | Miraglia |
| 5,094,171 A | 3/1992 | Fujita |
| 5,113,768 A | 5/1992 | Brown |
| 5,224,425 A | 7/1993 | Remington |
| 5,261,343 A | 11/1993 | Elterman et al. |
| D342,665 S | 12/1993 | Rekuc |
| 5,316,246 A | 5/1994 | Scott |
| D348,385 S | 7/1994 | Krauss |
| D355,585 S | 2/1995 | Terada |
| D372,188 S | 7/1996 | Van Dyke |
| D382,190 S | 8/1997 | Blackston et al. |
| 5,701,824 A | 12/1997 | Johnson et al. |
| D391,694 S | 3/1998 | Eichhorn |
| D391,840 S | 3/1998 | Striebel |
| D394,202 S | 5/1998 | Anscher |
| D402,189 S | 12/1998 | Izumi |
| 5,904,099 A | 5/1999 | Danneker |
| 5,931,100 A | 8/1999 | Sutton et al. |
| 5,954,301 A | 9/1999 | Joseph |
| 6,164,582 A | 12/2000 | Vara |
| 6,206,330 B1 | 3/2001 | Oi |
| D449,580 S | 10/2001 | Gee, II |
| 6,363,589 B1 * | 4/2002 | Calloway ............... F16B 45/02 24/599.1 |
| 6,363,858 B1 | 4/2002 | Voirin |
| 6,588,076 B1 * | 7/2003 | Choate ............... F16B 45/02 24/599.1 |
| 6,640,727 B2 | 11/2003 | Ostrobrod |
| D484,035 S | 12/2003 | Smith-Keilland et al. |
| 6,666,773 B1 | 12/2003 | Richardson |
| D488,054 S | 4/2004 | Myers |
| D491,049 S | 6/2004 | Kung |
| 6,810,818 B2 | 11/2004 | Petzl et al. |
| D549,557 S | 8/2007 | Mori et al. |
| D568,254 S | 5/2008 | Patchett |
| D569,234 S | 5/2008 | Young, IV |
| D569,236 S | 5/2008 | Young, IV |
| D569,712 S | 5/2008 | Young, IV |
| 7,381,137 B2 | 6/2008 | Steele et al. |
| D572,573 S | 7/2008 | Abels |
| D575,143 S | 8/2008 | Kuo et al. |
| D579,763 S | 11/2008 | Uehara |
| D583,654 S | 12/2008 | Uehara |
| D589,899 S | 4/2009 | Huang |
| D595,120 S | 6/2009 | Plowman |
| D596,128 S | 7/2009 | Hung |
| 7,610,706 B2 | 11/2009 | Pitcher et al. |
| 7,624,684 B2 | 12/2009 | Morris |
| D613,697 S | 4/2010 | Symons |
| D617,741 S | 6/2010 | Fennell |
| 7,819,066 B2 | 10/2010 | Smith |
| 7,825,337 B2 | 11/2010 | Young, IV |
| D640,527 S | 6/2011 | Hoek |
| D644,501 S | 9/2011 | Chen |
| 8,016,073 B2 | 9/2011 | Petzl et al. |
| D648,685 S | 11/2011 | Symons |
| D649,024 S | 11/2011 | Takazakura |
| D657,869 S | 4/2012 | Mammen |
| D658,094 S | 4/2012 | Dunn |
| D665,655 S | 8/2012 | Ishii |
| D668,620 S | 10/2012 | Convert |
| D670,995 S | 11/2012 | Stieler |
| 8,336,463 B2 | 12/2012 | Smith |
| D675,806 S | 2/2013 | Caul |
| D680,851 S | 4/2013 | Lo |
| 8,424,460 B2 | 4/2013 | Lerner et al. |
| 8,601,951 B2 | 12/2013 | Lerner |
| 8,695,913 B2 | 4/2014 | Cheng |
| D719,798 S | 12/2014 | Thompson |
| 8,985,027 B2 | 3/2015 | Brown |
| 8,998,151 B2 | 4/2015 | Hoek |
| 9,016,649 B2 | 4/2015 | Nolle |
| D730,159 S | 5/2015 | Grimm |
| 9,033,115 B2 | 5/2015 | Lerner |
| D735,018 S | 7/2015 | McEvilly |
| D740,645 S | 10/2015 | Koreishi |
| D742,212 S | 11/2015 | Hsu |
| 9,242,659 B2 | 1/2016 | Bernier |
| 9,322,428 B2 * | 4/2016 | Perner ............... F16B 45/02 |
| 9,381,926 B2 | 7/2016 | Brannan |
| D767,500 S | 9/2016 | Byrne |
| D768,089 S | 10/2016 | Liu |
| D773,414 S | 12/2016 | Hoffman |
| D774,002 S | 12/2016 | Hsieh |
| D774,383 S | 12/2016 | Kennedy |
| D785,316 S | 5/2017 | Grossman |
| D790,127 S | 6/2017 | Verleur |
| D794,725 S | 8/2017 | Lamothe |
| D799,941 S | 10/2017 | Rotherberg |
| D802,168 S | 11/2017 | Lee |
| D802,866 S | 11/2017 | Williams |
| D805,879 S | 12/2017 | Garcia |
| D807,735 S | 1/2018 | Nimgulkar et al. |
| D811,857 S | 3/2018 | Williams |
| D821,090 S | 6/2018 | Case |
| 9,988,252 B1 | 6/2018 | Kunstadt |
| D822,122 S | 7/2018 | Bilezikian |
| D822,461 S | 7/2018 | Han |
| D822,462 S | 7/2018 | Han |
| D822,463 S | 7/2018 | Han |
| D823,710 S | 7/2018 | Schone et al. |
| 10,023,207 B2 | 7/2018 | Brown |
| 10,023,208 B2 | 7/2018 | Brown |
| 10,046,745 B2 | 8/2018 | McGowan |
| 10,060,466 B2 | 8/2018 | Kaneko |
| 10,065,507 B1 | 9/2018 | Lerner |
| D833,854 S | 11/2018 | Yamamoto |
| D834,402 S | 11/2018 | Bailey |
| D835,497 S | 12/2018 | Rindy et al. |
| D835,974 S | 12/2018 | Moore et al. |
| D835,975 S | 12/2018 | Putnam, Jr. |
| D837,635 S | 1/2019 | Petzl et al. |
| D841,440 S | 2/2019 | Bailey |
| D843,813 S | 3/2019 | Tillitski |
| 10,333,378 B2 | 6/2019 | Lerner |
| D852,609 S | 7/2019 | LeBeau |
| D862,205 S | 10/2019 | Bailey |
| D865,492 S | 11/2019 | Bailey |
| D869,937 S | 12/2019 | Walker |
| 10,532,662 B2 | 1/2020 | McGowan |
| 10,544,822 B2 | 1/2020 | Bailey |
| D882,378 S | 4/2020 | Graykowski |
| D892,600 S | 8/2020 | Schmitz |
| D892,601 S | 8/2020 | Schmitz |
| D894,718 S | 9/2020 | Kramer |
| D902,009 S | 11/2020 | Yang |
| D933,462 S | 10/2021 | Zunzunegui |
| 2002/0050032 A1 | 5/2002 | Carnall |
| 2002/0162477 A1 | 11/2002 | Palumbo |
| 2002/0179372 A1 | 12/2002 | Schreiber |
| 2004/0118982 A1 | 6/2004 | Shillings |

(56) References Cited

U.S. PATENT DOCUMENTS

| | | |
|---|---|---|
| 2005/0189453 A1 | 9/2005 | DeGuevera |
| 2005/0246874 A1* | 11/2005 | Hsu .................. F16B 45/02 24/598.2 |
| 2006/0087139 A1 | 4/2006 | Ayres |
| 2006/0137151 A1* | 6/2006 | Thompson ............ F16B 45/02 24/598.2 |
| 2006/0179784 A1 | 8/2006 | Chen |
| 2007/0235597 A1 | 10/2007 | Winchester |
| 2008/0178760 A1 | 7/2008 | Frangos et al. |
| 2008/0202375 A1 | 8/2008 | Quattlebaum |
| 2009/0223406 A1 | 9/2009 | Smith |
| 2010/0224714 A1 | 9/2010 | Winther et al. |
| 2010/0288586 A1 | 11/2010 | Gorbounov |
| 2010/0308149 A1 | 12/2010 | Allington |
| 2010/0325848 A1 | 12/2010 | Liang |
| 2011/0023275 A1 | 2/2011 | Thompson |
| 2011/0083577 A1 | 4/2011 | Tilley |
| 2011/0239898 A1 | 10/2011 | Brown |
| 2012/0031296 A1 | 2/2012 | Smith |
| 2012/0055740 A1 | 3/2012 | Allington |
| 2013/0327242 A1 | 12/2013 | Bernier |
| 2014/0245576 A1 | 9/2014 | Pemer |
| 2014/0311376 A1 | 10/2014 | Brannan |
| 2014/0326161 A1 | 11/2014 | Halliday |
| 2015/0231423 A1 | 8/2015 | Pemer |
| 2015/0266454 A1 | 9/2015 | McGowan |
| 2015/0375758 A1 | 12/2015 | Strasser |
| 2016/0050481 A1 | 2/2016 | Moats |
| 2016/0361578 A1 | 12/2016 | Casebolt |
| 2017/0121154 A1* | 5/2017 | Costa .................. F16B 45/02 |
| 2018/0216656 A1 | 8/2018 | Bailey |
| 2018/0304907 A1 | 10/2018 | Richardson |
| 2018/0326957 A1 | 11/2018 | McGowan |
| 2019/0109528 A1 | 4/2019 | Lerner |
| 2019/0134437 A1 | 5/2019 | Weston et al. |
| 2019/0144244 A1 | 5/2019 | McGowan |

FOREIGN PATENT DOCUMENTS

| | | |
|---|---|---|
| EP | 1386814 | 2/2004 |
| GB | 920392 | 3/1963 |
| GB | 1527238 | 10/1978 |
| GB | 2503737 | 1/2014 |
| WO | 2009143529 | 11/2009 |

OTHER PUBLICATIONS

PETZL Adventure Parks Catalog Z014AA04, 2017, in Spanish, 16 pages (and the English translation for the PETZL Adventure Parks Catalog Z014AC05, (dated 2019), 11 pages, (27 pages all together).

PCT International Search Report and Written Opinion in International Application PCT/US2020/058898, dated Feb. 25, 2021, 21 pages.

Rock Exotica LLC, "SwivaEye Auto-Lock Carabiner", Mar. 12, 2019, retrieved from the internet on Feb. 16, 2021 at: https://web.archive.org/web/20190312071326/https://rockexotica.com/product/swivels/swivaeye/#expand, 3 pgs.

PCT International Preliminary Reporton Patentability in Application PCT/US2018/016475, dated Aug. 15, 2019, 8 pgs.

* cited by examiner

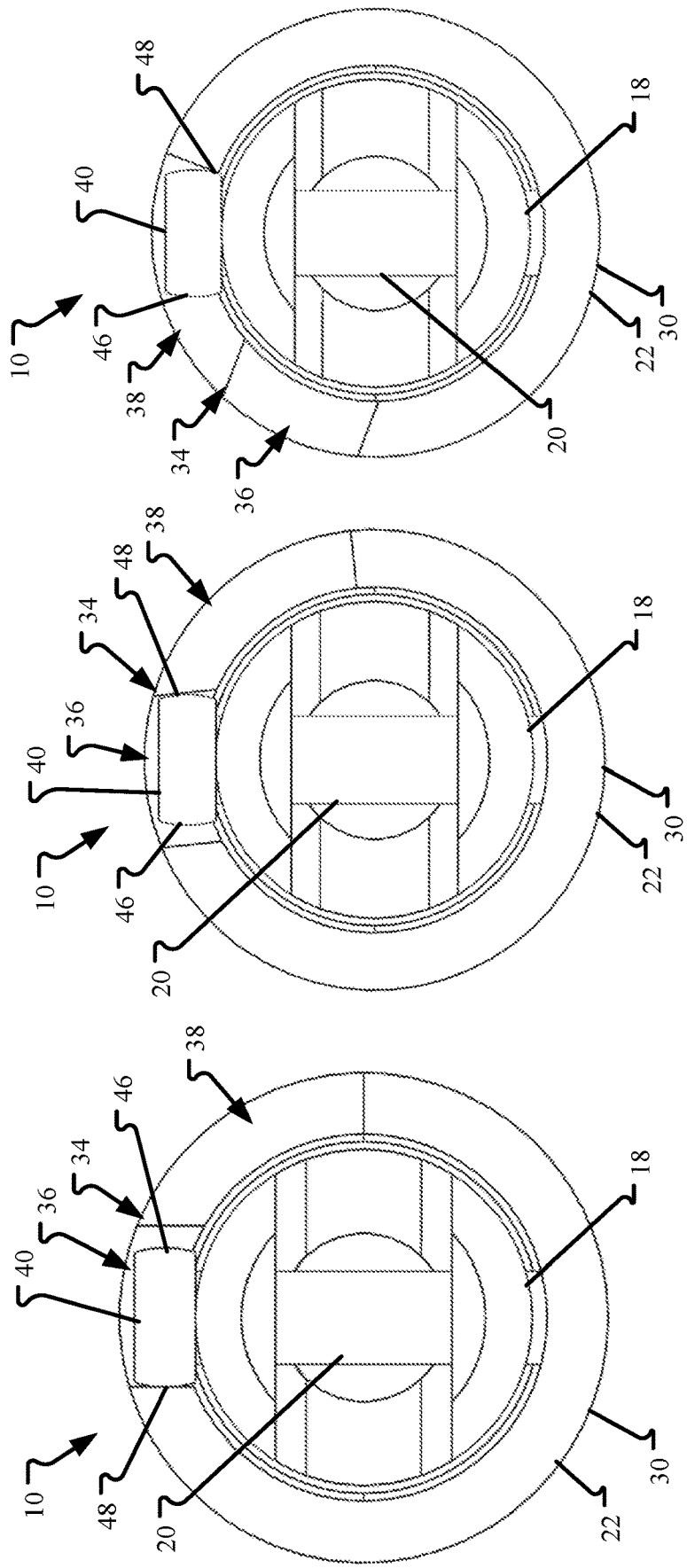

CARABINER

CROSS-REFERENCE TO RELATED APPLICATIONS

This application claims priority to and the benefit of U.S. Provisional Application No. 62/989,401, filed Mar. 13, 2020, and U.S. Provisional Application No. 62/930,779, filed Nov. 5, 2019, which are incorporated by reference herein in their entireties.

INTRODUCTION

Generally, carabiners include a metal loop having a spring-loaded gate and they are widely used in cable and rope intensive activates for quickly and reversibly connecting two or more components. These activities include, but are not limited to, rock and mountain climbing (e.g., indoor or outdoor climbing), zip lining, arboriculture, caving, sailing, hot air ballooning, rope rescue, construction, industrial rope work, window cleaning, whitewater rescue, acrobatics, etc. At least some known carabiners include locking gates to secure the carabiner gate against unintentional opening during use. Some known locking carabiners are automatic twist/push-locking that have a security sleeve over the gate that must be manually rotated and/or pulled to disengage so as to unlock and enable operation of the gate. However, these known twist/push-locking carabiners may be unintentionally defeated by the carabiner rubbing against the rope or equipment in a motion that rotates and/or pulls the security sleeve in a direction that unlocks and opens the gate.

Additionally, some cable and rope intensive activities generate a high number of locking-unlocking cycles on the carabiner over a relatively short time period. For example, line dispensing devices, such as auto-belay devices used for climbing, retract slack when the rope is not under load (e.g., when the climber is climbing) and provides a braking force when the rope is loaded (e.g., when the climber falls) so that the climber on the end of the rope is lowered to the ground. These systems allow climbers to climb alone and eliminate the need for a separate belayer, and as such, the carabiner that attaches the user to the auto-belay device can be opened and closed many times during climbing sessions. Repetitive locking and unlocking of the gate induces wear on the security sleeve, which over time, reduces the locking and closing functionality of the carabiner.

Carabiner

This disclosure describes examples of an automatic locking swivel carabiner. The locking mechanisms for a carabiner gate are enabled to reduce wear, thereby increasing performance of the locking mechanism and extending the life of the carabiner. Additionally, the locking mechanism reduces or prevents unintentional defeat because a bind is created between a locking collar and a carabiner body that requires a full and distinct motion to unlock the locking collar before opening the carabiner. Furthermore, the carabiner describe herein enables for secondary gated attachments to be used without defeating the swivel capabilities of the carabiner.

These and various other features as well as advantages that characterize the carabiners described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not mean to limit the scope of the invention as claimed in any manner, which scope shall be based on the claims appended hereto.

FIG. 4 is an end view of the prior art locking gate in a rotational lock position.

FIG. 5 is another end view of the prior art locking gate in the rotational lock position.

FIG. 6 is an end view of the prior art locking gate in a rotational unlock position.

DETAILED DESCRIPTION

Figure 1:
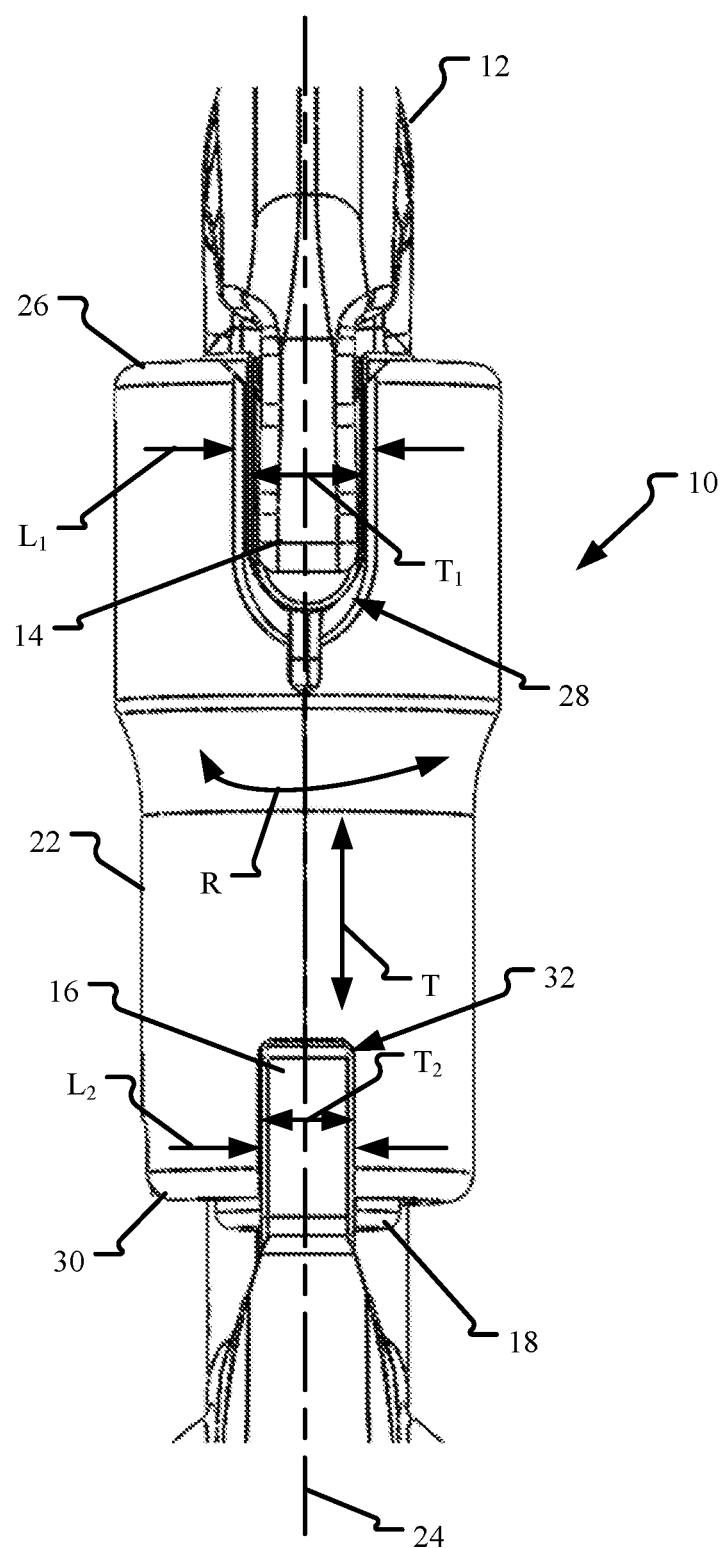
FIG. 1 is a side view of a prior art locking gate in an unlocked and closed position.

This disclosure describes examples of a triple-locking swivel carabiner, although the features of the swivel carabiner can also be used in double-locking carabiners as required or desired. The carabiners described herein have a gate that is pivotably coupled to a body and extending between a hinge end and a nose end. The gate can pivot relative to the hinge end so as to open and close the carabiner with respect to the nose end. A locking collar is coupled to the gate, such that the gate can be automatically locked relative to the body when the gate is in the closed position. This locking feature reduces unintentional opening of the gate during use.

In both a triple-locking gate and a double-locking gate, the locking collar is rotatable relative to the gate. The rotational position of the locking collar engages and disengages the locking collar from the carabiner body so as to lock and unlock the gate for opening and closing. In the examples described herein, the locking collar has openings proximate the nose end and the hinge end that must clear the carabiner body so as to unlock the gate. The nose end opening is at least circumferentially offset from the hinge end opening on the locking collar, thereby requiring that the nose end opening clears the carabiner body prior to the hinge end opening. By offsetting these two openings, unintentional defeat of the locking collar is reduced or prevented because a bind is created between the locking collar and the carabiner body that requires a full and distinct rotation motion to unlock the locking collar. Additionally, the size of the nose end opening is lengthened. By increasing the size of the nose end opening and offsetting the two openings, wear on the carabiner's locking mechanism is reduced, thereby increasing performance of the locking mechanism and extending the life of the carabiner.

In a triple-locking gate, the locking collar is also translatable relative to the gate so that the locking collar has to be moved out of a rotational locking position prior to unlocking the gate. This rotational lock is enabled by a pin slidably received within a raceway at an end of the locking collar and requires translation of the locking collar to rotationally unlock the locking collar. In the examples described herein, the pin is machined and the raceway is 3D milled so that the raceway is always tangent to the pin as the pin slides thereon. This configuration increases face-on-face contact area between the pin and the raceway to reduce stress concentrations. As such, additional wear on the carabiner's locking mechanism is reduced, thereby increasing performance of the locking mechanism and extending the life of the carabiner.

Furthermore in the carabiners described herein, the carabiner body also includes a spine having a captive eye for receiving a secondary gated attachment. The captive eye swivels with the carabiner body so that the secondary gated attachment can be used without defeating the swivel capabilities of the carabiner. The spine also can at least partially contour to the locking collar so that when the locking gate is open, the opening width is enlarged while maintaining an overall compact design of the carabiner.

As used herein, the terms "axial" and "longitudinal" refer to directions and orientations, which extend substantially parallel to a centerline of the locking gate. Moreover, the terms "radial" and "radially" refer to directions and orientations, which extend substantially perpendicular to the centerline of the locking gate. In addition, as used herein, the term "circumferential" and "circumferentially" refer to directions and orientations, which extend arcuately about the centerline of the locking gate.

Figure 2:
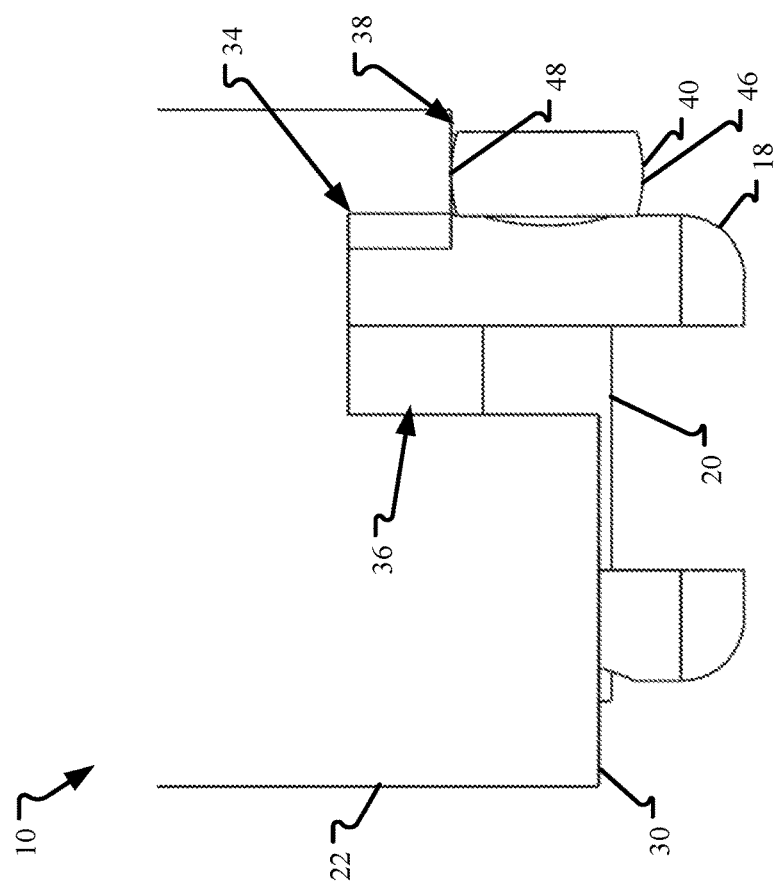
FIG. 2 is a partial enlarged view of the prior art locking gate in the unlocked position.

FIG. 1 is a side view of a prior art locking gate 10 in an unlocked position and closed position. FIG. 2 is a partial enlarged view of the prior art locking gate 10 in the unlocked position. Referring concurrently to FIGS. 1 and 2, the locking gate 10 is pivotably coupled to a carabiner body 12, although the carabiner body 12 is not illustrated in FIG. 2 for clarity. The body 12 includes a nose end 14 and a hinge end 16. The locking gate 10 includes a gate 18 that is pivotably coupled to the hinge end 16 of the body 12 via a pin 20. The gate 18 is configured to engage with the nose end 14 of the body so as to define a closed position and that is illustrated in FIG. 1. The locking gate 10 also includes a locking collar 22 coupled to the gate 18 and configured to lock the gate 18 in the closed position. The gate 18 defines a longitudinal axis 24 and the locking collar 22 is rotatable R about the longitudinal axis 24 and translatable T along the longitudinal axis 24 relative to the gate 18.

The locking collar 22 includes a first end 26 having a first opening 28 and an opposite second end 30 having a second opening 32. The first opening 28 has a first circumferential length $L_1$ that is about equal to the thickness $T_1$ of the nose end 14 and the second opening 32 has a second circumferential length $L_2$ that is about equal to the thickness $T_2$ of the hinge end 16. In the prior art, the thicknesses $T_1$ and $T_2$ of the nose end 14 and the hinge end 16 are about equal so that the first circumferential length $L_1$ is about equal to the second circumferential length $L_2$. As such, when the locking collar 22 rotates towards the unlocked position, the first opening 28 aligns with the nose end 14 substantially simultaneously with the second opening 32 aligning with the hinge end 16. Once the locking collar 22 clears the nose end 14 and the hinge end 16 of the carabiner body 12, the locking collar 22 is unlocked as illustrated in FIG. 1 so that the gate 18 is enabled to pivot about the pin 20 and move towards an open position. Additionally in the prior art, the axial centerlines of the first opening 28 and the second opening 32 are aligned on the locking collar 22. That is, the axial centerlines of the openings 28, 32 are aligned with the longitudinal axis 24 as illustrated in FIG. 1, and as such, upon rotation R of the locking collar 22 both openings 28, 32 clear the body 12 at the same time to unlock the locking gate 10.

The second end 30 of the locking collar 22 also includes a raceway 34 having both an axial portion 36 and a circumferential portion 38 that are coupled in communication together. The pin 20 includes an enlarged head 40 that is slidably received within the raceway 34. When the pin head 40 is within the axial portion 36 of the raceway 34, rotation R of the locking collar 22 is prevented, however, upon translation T of the locking collar 22, the pin head 40 is moved within the circumferential portion 38 so that the locking collar 22 can rotate R and unlock the locking gate 10. FIG. 2 illustrates the pin head 40 being within the circumferential portion 38 of the raceway 34, and thus, rotation R of the locking collar 22 is enabled.

In the example, the prior art locking gate 10 is considered triple-locking with a first lock configuration being the gate 18 engaging with the nose end 14 of the body 12, a second lock configuration being the locking collar 22 rotated R such that it is engaged with the body 12 and the gate 18 is prevented from moving towards the open position, and a third lock configuration being the locking collar 22 translated T so that the pin head 40 is received within the axial portion 36 of the raceway 34 and the locking collar 22 is rotationally locked. The locking gate 10 is biased so as to automatically return to a fully locked positioned and all three lock configurations are engaged. As such, to unlock the locking gate 10, the locking collar 22 is first translated T along the longitudinal axis 24 so that the pin head 40 is moved from the axial portion 36 to the circumferential portion 38 of the raceway 34. This position of the pin head 40 enables the locking collar 22 to then rotate R about the longitudinal axis 24 so as to align the openings 28, 32 with the nose end 14 and the hinge end 16, respectively, and unlock the gate 18. Once unlocked, the gate 18 can pivot into the open position. This prior art locking gate 10, however, has some functional disadvantages that are described further below in reference to FIGS. 3-6.

It is appreciated that while a triple-locking gate 10 is illustrated and described, the locking gate 10 may alternatively be a double-locking gate 10, whereby the locking collar 22 is only rotatable R about the longitudinal axis 24 so as to lock the gate 18 in the closed position. In the double-locking gate example, the locking collar 22 is not necessarily translatable along the longitudinal axis 24.

As used herein, a closed position is when the gate 18 is engaged with the nose end 14 of the carabiner body 12 and an open position is when the gate 18 is pivoted inward relative to the body 12 so that the nose end 14 can receive various equipment components. The closed position is illustrated in FIG. 1. Additionally, a locked position is when the locking collar 22 is engaged with the carabiner body 12 so as to secure the gate 18 in the closed position and an unlocked position is when the locking collar 22 is disengaged with the carabiner body 12 such that the gate 18 is enabled to be moved towards the open position. The locked position may include two locking configurations (e.g., the second and third configurations described above) for a triple-locking gate or include one locking configuration (e.g., the second configuration described above) for a double-locking gate. The unlocked position is illustrated in FIGS. 1 and 2.

Figure 3:
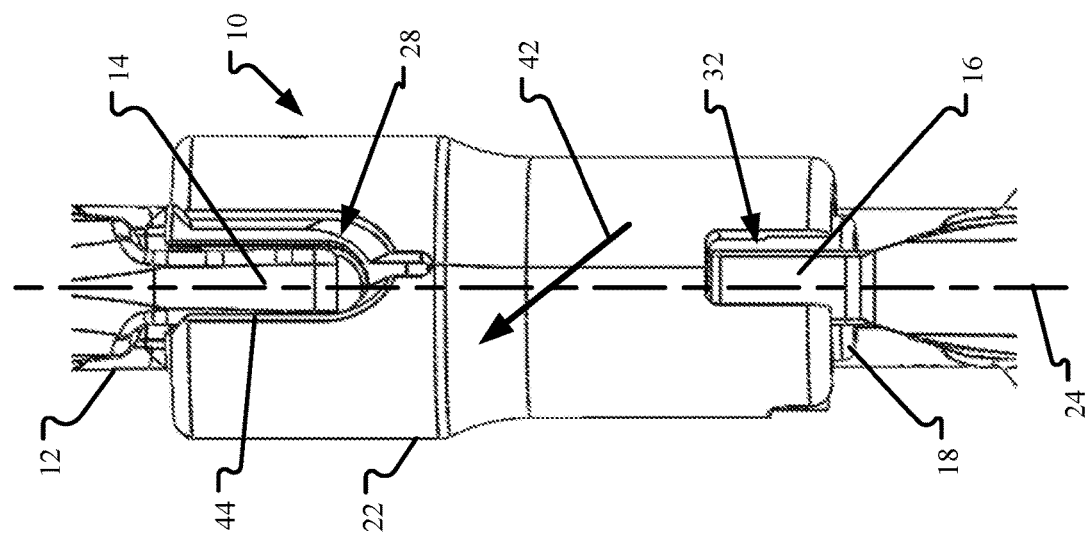
FIG. 3 is a schematic view of the prior art locking gate.

FIG. 3 is a schematic view of the prior art locking gate 10. Certain components are described above, and thus, are not necessarily described further. As described above, to unlock the locking gate 10, the locking collar 22 must be both translated along the longitudinal axis 24 and rotated about the longitudinal axis 24. Then once the locking collar 22 clears both the nose end 14 and the hinge end 16, the gate 18 is allowed to pivot into the open position. Unlocking the locking gate 10, generally requires manual manipulation of the locking gate 10 by the user, however, the locking gate 10 may be unintentionally defeated by rubbing against other equipment and/or the climbing surfaces in such a way that a force vector 42 is generated against the locking gate 10. The force vector 42 is generated in such an orientation and against the locking collar 22 that results in the locking collar 22 translating, rotating, and depressing the locking gate 10 in a single motion so as to undesirably unlock and open the locking gate 10. In double-locking gates, unintentional defeat is also an issue with the force vector 42 that results in rotating the locking collar 22 and depressing the locking gate in a single motion so as to undesirably unlock and open the locking gate 10.

Figure 9:
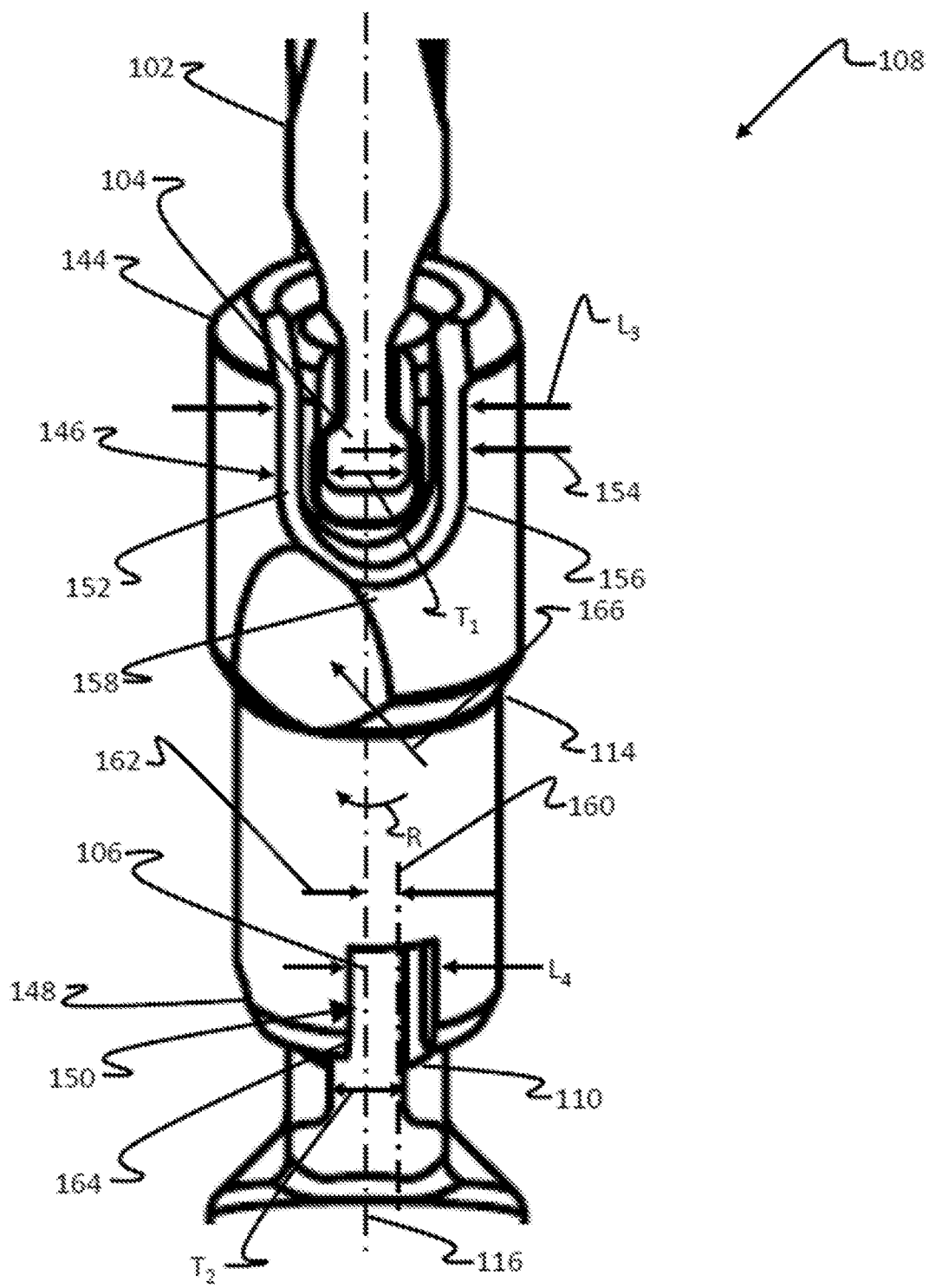
FIG. 9 is a side view of a locking gate of the carabiner in an intermediate and closed position.
Figure 10:
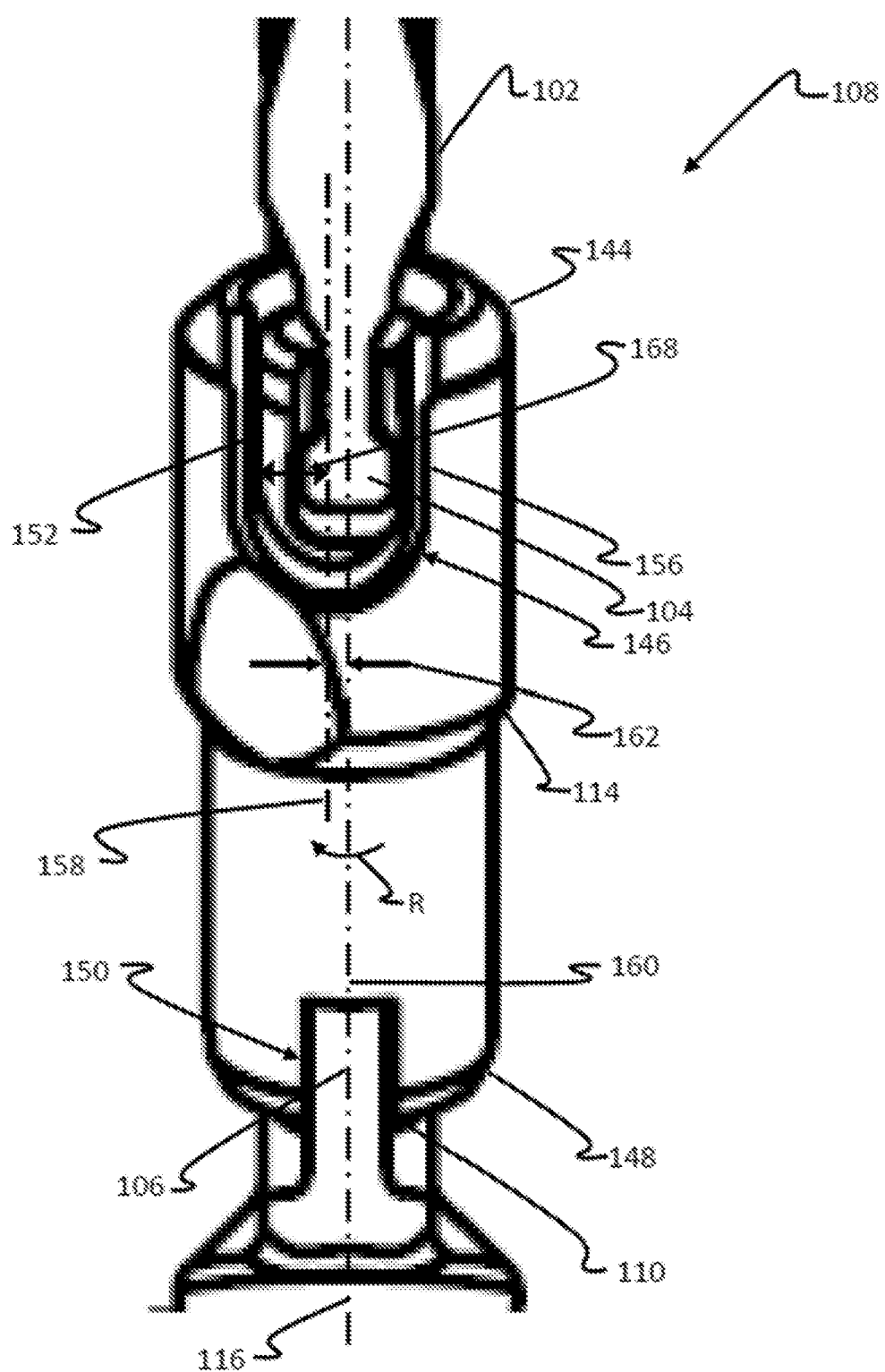
FIG. 10 is a side view of the locking gate in an unlocked and closed position.

The examples of the locking gate described herein and in FIGS. 9 and 10, reduces or prevents this unintentional defeat of the locking gate from the force vector 42. The openings on the locking collar are circumferentially offset so that the first opening clears the body prior to the second opening. As such, an intermediate position is formed that creates a bind between the locking collar and the body. This bind prevents the locking gate from completely unlocking and allowing the gate to open. As such, two or three (depending on the double- or triple-locking configuration) full and distinct gate unlocking motions are required to unlock the locking gate, and the force vector does not defeat the locking gate unlike the prior art locking gate 10.

Additionally, the prior art locking gate 10 has its locking collar 22 with the first opening 28 that substantially matches the size of the nose end 14. Because of the dimension of the first opening 28, when the locking gate 10 is in the open position and moves toward the close and lock positions, the locking collar 22 begins to rotate during closure pivoting of the gate 18, and thereby, contacts the nose end 14 when automatically returning to the closed and locked position. Thus, a sidewall 44 of the opening 28 slides and scrapes against and the nose end 14 of the carabiner body 12 during use. The sidewall 44 that wears could be on either side of the opening 28, depending on the rotation direction of the locking collar 22. The contact between the locking collar 22 and the body 12 increases undesirable wear and corrosion on the locking gate 10 and creates sharp edges between the contacting components that increases friction and can prevent the locking gate 10 from properly closing and locking.

The examples of the locking gate described herein and in FIGS. 9 and 10, reduces wear between the locking collar and the carabiner body. The nose end opening is enlarged and offset from the hinge end opening so that during the locking rotation of the locking collar, the locking collar does not come into contact with the nose end. Thus, wear is reduced and the reliability of the automatic close and lock functionality and the locking performance of the locking gate over the operational lifetime of the carabiner is increased compared to the prior art locking gate 10.

FIGS. 4-6 are end views of the prior art locking gate in a plurality of rotational positions. Referring concurrently to FIGS. 4-6 and with continued reference to FIG. 2, certain components are described above, and thus, are not necessarily described further. As described above, the pin 20 that the gate 18 pivots about to open and close the locking gate 10 has an enlarged head 40 which slides within the raceway 34 at the second end 30 of the locking collar 22. The position of the pin head 40 within the raceway 34 is the third locking configuration and determines if the locking collar 22 is rotatably locked in the triple-locking gate. The prior art pin head 40 is cold-formed, and as such, has a substantially cylindrical head wall 46 with a curved surface and is at least partially rounded due to the manufacturing process. Additionally, the raceway 34 is formed from a 1D and/or 2D milling process that results in a plurality of substantially flat surfaces orthogonal to the longitudinal axis 24 (shown in FIG. 1).

In operation, however, the concave surface of the head wall 46 slides across the raceway 34 (e.g. during rotation of the locking collar 22) and stress concentrations are formed at the small contact location area 48 of the head wall 46 against the raceway 34. These stress concentrations increase wear and corrosion, and create corresponding grooves within the surfaces of the raceway 34. This undesirable wear and corrosion increases friction between the pin head 40 and the locking collar 22 during movement of the locking collar 22 and can prevent the locking gate 10 from properly closing and locking.

FIGS. 4 and 5 illustrate the pin head 40 within the axial portion 36 of the raceway 34, and thus, the locking collar 22 is rotationally locked. FIGS. 2 and 6 illustrate the pin head 40 within the circumferential portion 38 of the raceway 34, and thus, the locking collar 22 is rotationally unlocked.

Additionally, the movement of the pin head 40 within the raceway 34 is not always orthogonal to the longitudinal axis 24. As such, because of the 1D and/or 2D milling process of the raceway, a contact location 48 of the head wall 46 on the raceway 34 changes during the rotational movement of the locking collar 22. For example, in FIGS. 2 and 4 the pin head 40 is substantially orthogonal to the surface of the raceway 34 being contacted 48 and the apex of the head wall 46 contacts the raceway 34. In other rotation positions of the locking collar 22, the surface of the raceway 34 being contacted 48 is located on the outside end of the pin head 40 as shown in FIG. 5. In still other rotational positions of the locking collar 22, the surface of the raceway 34 being contacted 48 is located on the inside end of the pin head as shown in FIG. 6. As such, the stress concentration location of the pin head 40 on the raceway 34 changes, thereby further increasing undesirable wear that can prevent the locking gate 10 from properly closing and locking.

The examples of the locking gate described herein and in FIGS. 11-17 use a machined pin head with flat surfaces and a raceway that is 3D milled so that the raceway surface is always tangent to the pin head so as to increase face-on-face contact areas and reduce stress distributions. Thus, wear is reduced and the reliability of the automatic close and lock functionality and the locking performance of the locking gate over the operational lifetime of the carabiner is increased compared to the prior art locking gate 10.

Figure 7:
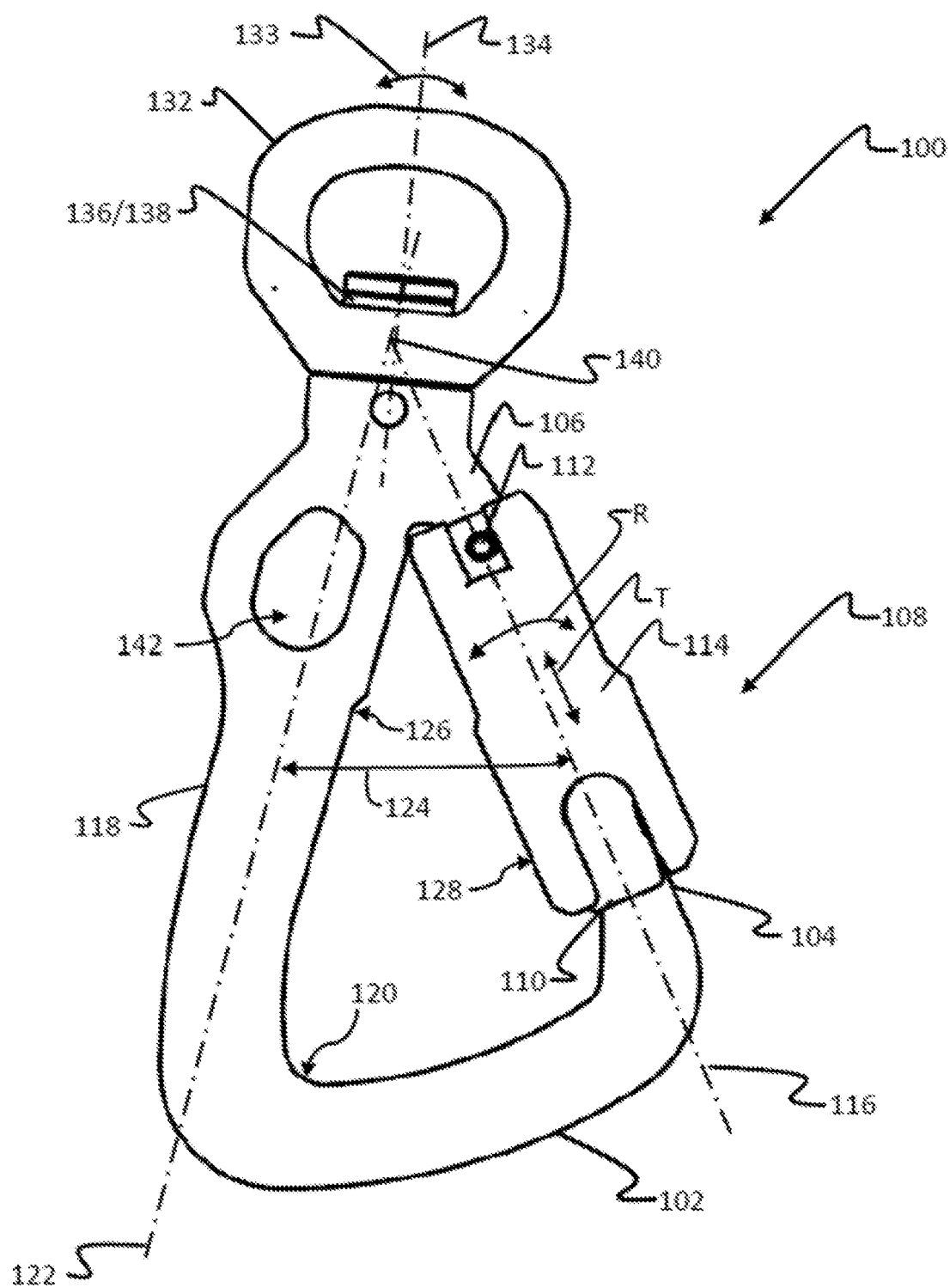
FIG. 7 is a side view of an exemplary carabiner in a closed and locked position.
Figure 8:
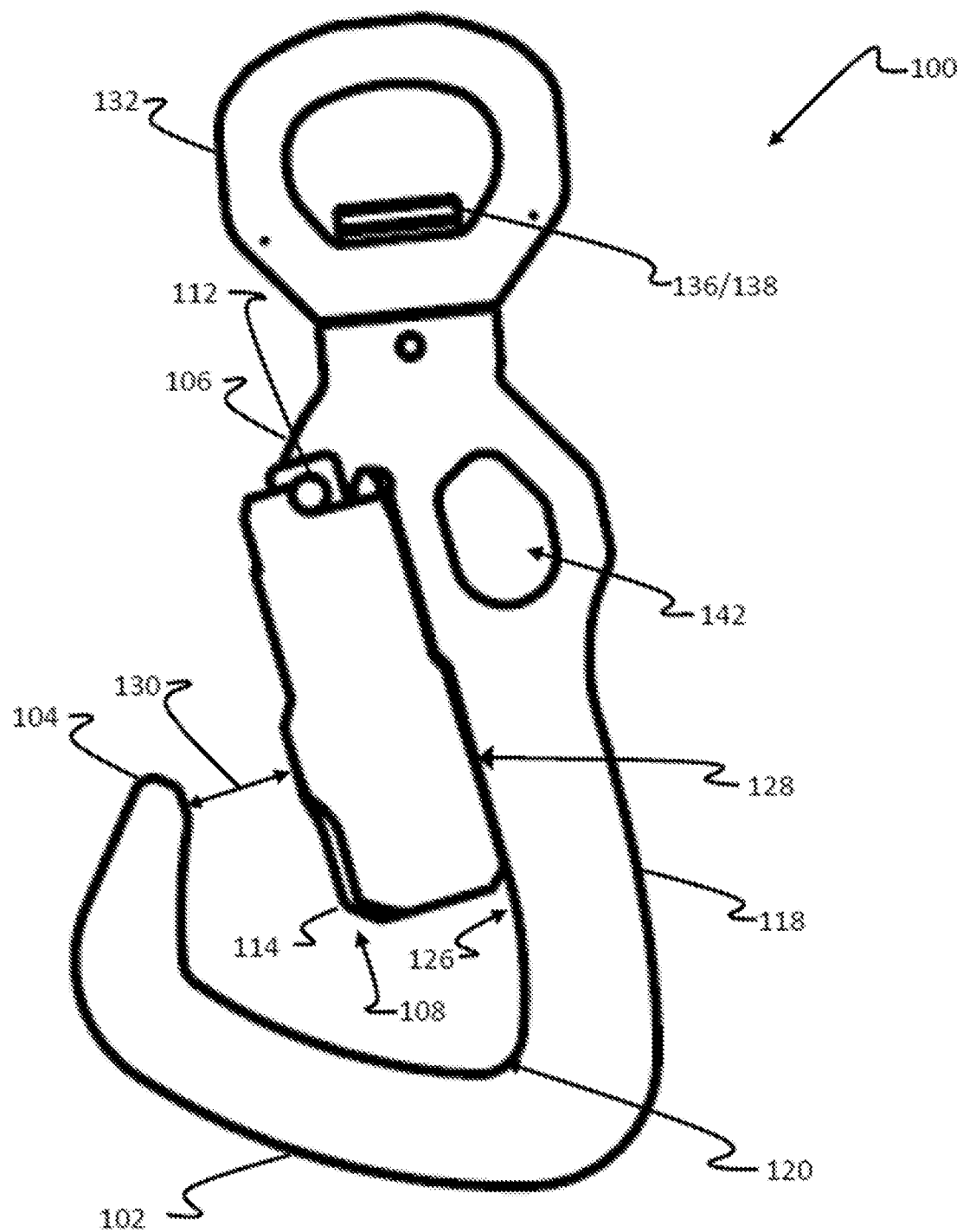
FIG. 8 is a side view of the carabiner in an open and unlocked position.

FIG. 7 is a side view of an exemplary carabiner 100 in a closed and locked position. FIG. 8 is a side view of the carabiner 100 in an open and unlocked position. Referring concurrently to FIGS. 7 and 8, the carabiner 100 includes a body 102 having a nose end 104 and a hinge end 106. A locking gate 108 is coupled to the body 102 and includes a gate 110 that is pivotably coupled to the hinge end 106 of the body 102 via a pin 112. The gate 110 is pivotable about the pin 112 and is configured to engage with the nose end 104 of the body 102 so as to define a closed position as illustrated in FIG. 7 and disengage with the nose end 104 of the body 102 so as to define an open position as illustrated in FIG. 8. The locking gate 108 also includes a locking collar 114 coupled to the gate 110 and configured to lock the gate 110 in the closed position so as to prevent opening. The gate 110 defines a longitudinal axis 116 and the locking collar 114 is rotatable R about the longitudinal axis 116 and translatable T along the longitudinal axis 116 relative to the gate 110.

The carabiner body 102 has a modified pear-shape with a spine 118 disposed opposite the gate 110. This shape forms a loading area 120 that is positioned away from the locking gate 108 when the locking gate 108 is closed and locked. The spine 118 has a spine axis 122 that is disposed at an angle 124 relative to the longitudinal axis 116 of the gate 110. In an example, the angle 124 is between approximately 25° and 55°. In an aspect, the angle 124 is approximately 40°. The spine 118 has an inner surface 126 that has a corresponding contour to that of an outer surface 128 of the locking collar 114 and as illustrated in FIG. 8. By contouring the inner surface 126 geometry of the spine 118 with the outer surface 128 geometry of the locking collar 114, or by contouring the outer surface 128 geometry of the locking collar 114 with the inner surface 126 geometry of the spine 118, the amount of unused space between the locking gate 108 and the body 102 is reduced when the carabiner 100 is in the open position (shown in FIG. 8). This configuration reduces the angle 124 between the locking gate 108 and the spine 118 so as to result in a more compact shape of the carabiner 100 that is easier to use with one hand, while increasing an opening width 130 between the nose end 104 and the locking collar 114 when the carabiner 100 is in the open position. Furthermore, this configuration enables the diameter of locking collar 114 to be enlarged so as to meet or exceed cross-loading standards as required or desired.

The carabiner 100 also includes a swivel loop 132 rotatably coupled to the body 102 so that the swivel loop 132 and the body 102 can rotate 133 relative to one another and about a rotational axis 134. A bushing 136 (e.g., polymer) is disposed between the swivel loop 132 and the body 102. The bushing 136 extends in both an axial direction and a radial direction relative to the rotational axis 134 so that the loop 132 and the body 102 do not slide directly against one another. As such, the bushing 136 includes a flange 138 that extends in a radial direction relative to the rotational axis 134, so that when the carabiner 100 is loaded and the loop 132 and the body 102 are being pulled in opposite directions, the bushing 136 is disposed within the loading path and wear is reduced. As such, performance of the carabiner 100 is increased. In the example, an intersection point 140 of the longitudinal axis 116 of the gate 110 and the spine axis 122 is disposed along the rotational axis 134 and within the connection between the swivel loop 132 and the body 102. This configuration also results in a more compact shape of the carabiner 100 and increases the performance strength of the carabiner 100.

A captive eye 142 is completely formed within the spine 118 and disposed proximate the swivel loop 132. The captive eye 142 and the locking gate 108 are both on the carabiner body 102 so that they can rotate 133 together about the rotational axis 134 and with respect to the swivel loop 132. This configuration enables a secondary gated attachment to be used with the carabiner 100 without defeating the swivel loop 132 as required or desired.

For example, when the carabiner 100 is used for auto-belay activities, the swivel loop 132 is attached to the auto-belay line (not shown) and the carabiner body 102 is attached to the climber (e.g., via a harness) with the locking gate 108 being able to reverse this attachment as required. The climber can then twist around without inducing a corresponding twist into the auto-belay line (e.g., via the swivel loop 132). A secondary tether (not shown) may be coupled to the captive eye 142 at one end, and the other end can have the secondary gated attachment (e.g., a carabiner) that also attaches to the climber. The secondary gated attachment forms a backup/redundant connection system because there have been cases where a connection is made to a wrong loop of a harness and there have been cases where the locking gate unintentionally opens due to rubbing against equipment and/or the wall. Additionally, since the secondary gated attachment is coupled to the carabiner body 102, the climber can still twist around without inducing a corresponding twist into the auto-belay line. In the example, the captive eye 142 is positioned along the spine axis 122 and is a fixed opening within the carabiner body 102 that is load rated.

In the example, the captive eye 142 is sized and shaped to receive the tether. The tether is typically a load bearing webbing or robe. In an aspect, the captive eye 142 has a length along the spine axis 122 that corresponds to the width of the tether. In another aspect, the captive eye 142 is sized and shaped so that another carabiner cannot be attached to the captive eye 142 and its nose cannot fit through the eye opening. Thereby, allowing for only the secondary attachment tether to be utilized.

In the example, the locking gate 108 is a triple-locking gate, and as such, to unlock the locking collar 114, it must be both translated T and rotated R so as to enable the gate 110 to open. In other examples, the locking gate 108 may be a double-locking gate, and as such, to unlock the locking collar 114, it must be rotated R so as to enable the gate 110 to open. In both examples, the gate 110 is pivotable between an open position as illustrated in FIG. 8 and a closed position as illustrated in FIG. 7. In the closed position, the gate 110 engages with the nose end 104 of the body 102. The position of the gate 110 defines a first lock configuration for both triple- and double-locking carabiners. In order to open and close the gate 110, the locking collar 114 must be rotated R between a first rotation position as illustrated in FIG. 7 that locks the locking gate 108 to the body 102 and a second rotation position as illustrated in FIG. 8 that unlocks the locking gate 108 from the body 102. The rotational position of the locking collar 114 defines a second lock configuration for both triple- and double-locking carabiners. The second lock configuration is described further below in reference to FIGS. 9 and 10.

For triple-locking carabiners, in addition to rotating R the locking collar 114, the locking collar 114 must also be translated T between a first translation position as illustrated in FIG. 7 that locks the rotational movement of the locking collar 114 and a second translational position as illustrated in FIG. 8 that unlocks the rotational movement of the locking collar 114. The translational position of the locking collar 114 defines a third lock configuration for the triple-locking carabiners. The third lock configuration is described further below in reference to FIGS. 11-17.

In both the triple- and double-locking carabiner examples, the locking gate 108, including both the gate 110 and the locking collar 114, is biased so as to automatically return to a closed and locked position. That is, the gate 110 is biased towards the closed position, while the locking collar 114 is biased towards the second rotation position and the second translation position. As such, to open and unlock the locking gate 108, the user must manually overcome the biased positions of the gate 110 and the locking collar 114. For example, one or more springs (not shown) may be housed within the locking collar 114 so as to provide the biasing mechanism for automatically locking and closing the locking gate 108.

FIG. 9 is an outside view of the locking gate 108 in an intermediate position. As described above, to move the locking collar 114 into an unlocked position and allow the gate 110 to open relative to the carabiner body 102, the locking collar 114 is rotated R about the longitudinal axis 116 and relative to the gate 110. While the locking collar 114 is shown as rotating R clockwise to unlock the locking gate 108, it is appreciated that alternatively, the locking collar 114 may rotate counter-clockwise towards the unlocked position as required or desired.

The locking collar 114 includes a first end 144 having a first opening 146 and an opposite second end 148 having a second opening 150. The locking collar 114 unlocks the gate 110 when both the first opening 146 clears the nose end 104 and the second opening 150 clears the hinge end 106. In the example, the first opening 146 has a first circumferential length $L_3$ that is greater than the thickness $T_1$ of the nose end 104. As such, the circumferential length $L_3$ is greater than the prior art length $L_1$ of the first opening 28 (shown in FIG. 1). In an aspect, the length $L_3$ is more than 10% greater than the length $L_1$. In another aspect, the length $L_3$ is more than 20% greater than the length $L_1$. In still another aspect, the length $L_3$ is between about 5% and 30% greater than the length $L_1$. By enlarging the circumferential length $L_3$ of the first opening 146, when the locking collar 114 rotates, a first sidewall 152 of the opening 146 clears the nose end 104 while an offset 154 is formed between a second sidewall 156 and the nose end 104.

The second opening 150 has a second circumferential length $L_4$ that is about equal to the thickness $T_2$ of the hinge end 106. In some examples, the thickness $T_1$ of the nose end 104 is about equal to the thickness $T_2$ of the hinge end 106. As such, the first circumferential length $L_3$ of the first opening 146 is greater than the second circumferential length $L_4$ of the second opening 150. Unlike the prior art design (shown in FIGS. 1-6), the first opening 146 is circumferentially offset from the second opening 150. That is, the first opening 146 has a first centerline 158 that is aligned with the longitudinal axis 116 in FIG. 9 and the second opening 150 has a second centerline 160 that is circumferentially offset 162 from the first centerline 158. In an example, the centerlines 158, 160 of each of the openings 146, 150 are circumferentially offset 162 on the locking collar 114 between approximately 5° and 30°.

In the example, the offset 162 configuration of the first opening 146 and the second opening 150 results in the first opening 146 clearing the nose end 104 before the second opening 150 clears the hinge end 106 upon rotation R of the locking collar 114 towards the unlocked position. This intermediate position of the locking collar 114 is illustrated in FIG. 9. In the intermediate position, after the first sidewall 152 of the first opening 146 clears the nose end 104, a first sidewall 164 of the second opening 150 still covers the hinge end 106 so that the locking collar 114 prevents the gate 110 from opening. The intermediate position of the locking collar 114 disables the gate 110 from opening unless the locking collar 114 is manipulated with a full and distinct gate unlocking rotation R movement about the longitudinal axis 116.

The offset 162 of the openings 146, 150 also reduces or prevents unintentional defeat of the locking gate 108. When the locking gate 108 rubs against other equipment and/or climbing surfaces and a force vector 166 is generated against the locking gate 108 that induces the locking collar 114 to translate, rotate, and/or depress the locking gate 108. Once the intermediate position is reached, a bind is created between the second end 148 of the locking collar 114 and the hinge end 106. This bind prevents the locking gate from completely unlocking and allowing the gate 110 to open with a single motion. Instead, to unlock the locking collar 114 requires a full and distinct unlocking motion. The bind also increases as the force trying to opening locking gate 108 is increased. In double-locking gates, when the force vector 166 rotates and/or depresses the locking gate 108, a bind is also created, thereby preventing the locking gate from completely unlocking and allowing the gate 110 to open. In the example, the bind location is between an inside surface of the locking collar 114 and an outside surface of the hinge end 106.

FIG. 10 is an outside view of the locking gate 108 in an unlocked position. Certain components are described above, and thus, are not necessarily described further. Upon further rotation R of the locking collar 114 about the longitudinal axis 116 from the intermediate position (shown in FIG. 9), the first opening 146 remains clear of the nose end 104 and the second opening 150 clears the hinge end 106. Once both the first opening 146 clears the nose end 104 and the second opening 150 clears the hinge end 106, the locking collar 114 is unlocked and disengaged from the carabiner body 102 so that the gate 110 may be opened. Said another way, the second opening 150 clears the hinge end 106 after the first opening 146 clears the nose end 104 so as to unlock the locking collar 114.

In the unlocked position, the second centerline 160 of the second opening 150 is aligned with the longitudinal axis 116 in FIG. 10 and the first centerline 158 of the first opening 146 is rotated further in the clockwise direction. In the unlocked position, the first sidewall 152 of the first opening 146 is now offset 168 from the nose end 104, while the second sidewall 156 is closer to, but still clear, of the nose end 104, thereby allowing the gate 110 to open. The offset 168 of the sidewall 152 from the nose end 104 provides additional space between the first end 144 of the locking collar 114 and the nose end 104 so that when the locking collar 114 automatically rotates back into the locked position (e.g., counter-clockwise), the sidewall 152 does not contact the nose end 104. This additional space reduces wear between the locking collar 114 and the carabiner body 102, and thus, increases the reliability of the automatic close and lock functionality and increases locking performance of the locking gate 108 over the operational lifetime of the carabiner.

Figure 11:
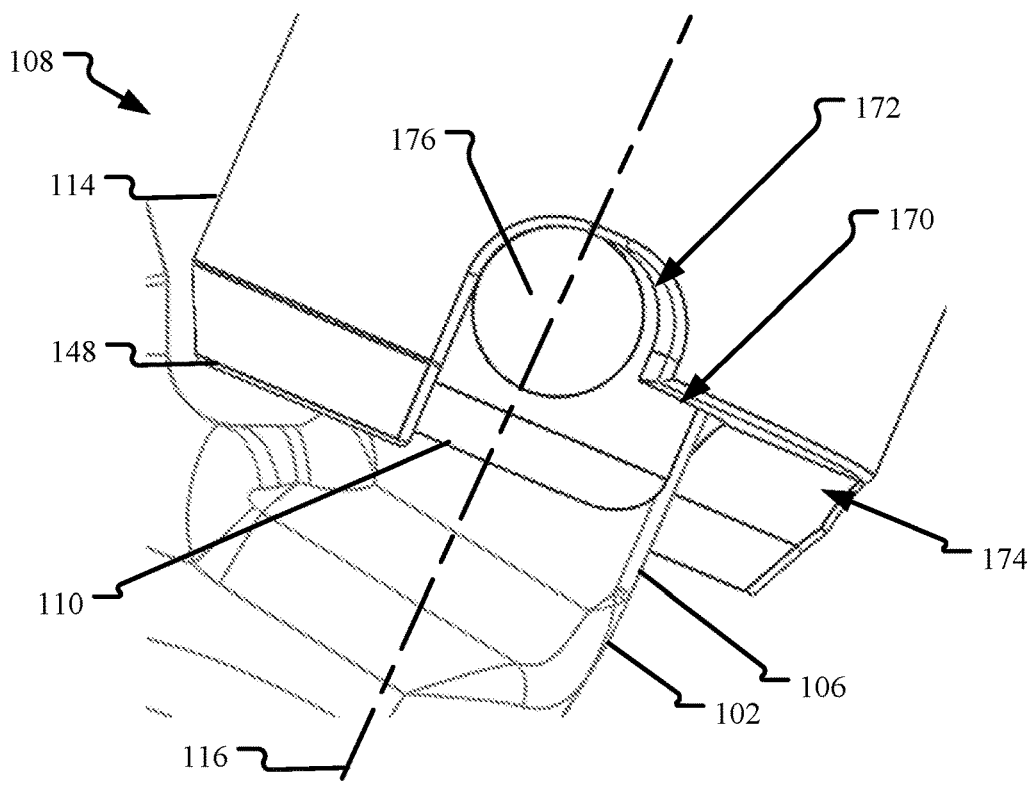
FIG. 11 is a partial side view of the locking gate in a rotational lock position.
Figure 12:
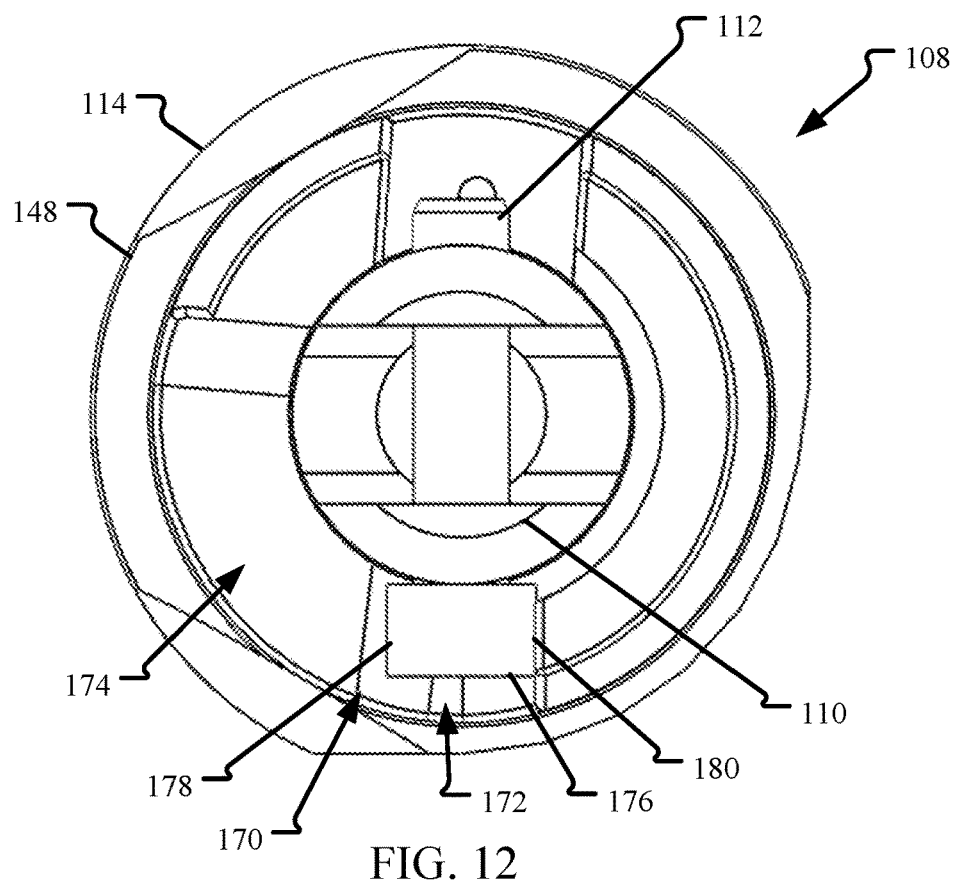
FIG. 12 is an end view of the locking gate in the rotational lock position.

FIG. 11 is a partial side view of the locking gate 108 in a rotational lock position. FIG. 12 is an end view of the locking gate 108 in the rotational lock position. Referring concurrently to FIGS. 11 and 12, the second end 148 of the locking collar 114 includes a raceway 170 having both an axial portion 172 and a circumferential portion 174 that are coupled in communication together. The axial portion 172 extends along the longitudinal axis 116. The pin 112 includes an enlarged head 176 that is slidably received within the raceway 170. The pin 112 pivotably couples the gate 110 to the hinge end 106 of the body 102. In examples were the locking gate 108 is triple-locking, the position of the pin head 176 within the raceway 170 determines if the locking collar 114 is allowed to rotate and unlock the locking gate 108 as described above in reference to FIGS. 9 and 10. In double-locking gates, the pin head 176 and raceway 170 features may not be included. As illustrated in FIGS. 11 and 12, the pin head 176 is received within the axial portion 172 of the raceway 170 such that rotation of the locking collar 114 is prevented.

In the example, the pin head 176 is machined formed so that it has a substantially flat and parallel cylindrical head wall 178. That is the pin head 176 is a right angle cylindrical component. Additionally, the raceway 170 is formed from a 3D milling process with surfaces that are substantially flat and parallel to the movement of the pin head 176 with all approach angles accounted for during the locking collar's 114 rotation. As such, the surfaces of the raceway 170 are not necessary parallel and/or orthogonal to the longitudinal axis 116, because 3D milling allows the mill to be moved relative to the locking collar 114 just as the pin head 176 moves during operation of the locking gate 108. By 3D milling the raceway 170, the surfaces of the raceway 170 are always tangent to the fixed pin 112 and the cylindrical head wall 178 as the locking collar 114 is being rotated relative to the pin 112. This results increasing face-on-face contact area 180 between the head wall 178 and the raceway 170 at every location and reduces stress concentrations when compared to the prior art shown in FIGS. 4-6. As used herein, "tangent" means that the surfaces of the raceway 170 are orthogonal to a diameter line of the pin head 176 going through a center point of the pin head and within ±10° from orthogonal. In an aspect, tangent can be ±5° from orthogonal.

Additionally, the thickness of the raceway 170 is greater than or equal to the thickness of the pin head 176 so that the majority of the pin head 176 is in face-on-face contact with the raceway 170 to further reduce stress concentrations. As illustrated in FIG. 12, the head wall 178 is parallel to the contacting surface of the axial portion 172, and thus, undesirable grooves within the surface of the raceway 170 are less likely to be formed. By reducing stress concentrations between the pin 112 and the locking collar 114, wear is reduced, and thus, increases the reliability of the automatic close and lock functionality and increases locking performance of the locking gate 108 over the operational lifetime of the carabiner. As used herein, face-on-face contact means that the surface of the raceway 170 is always tangent to the cylindrical head wall 178.

Figure 13:
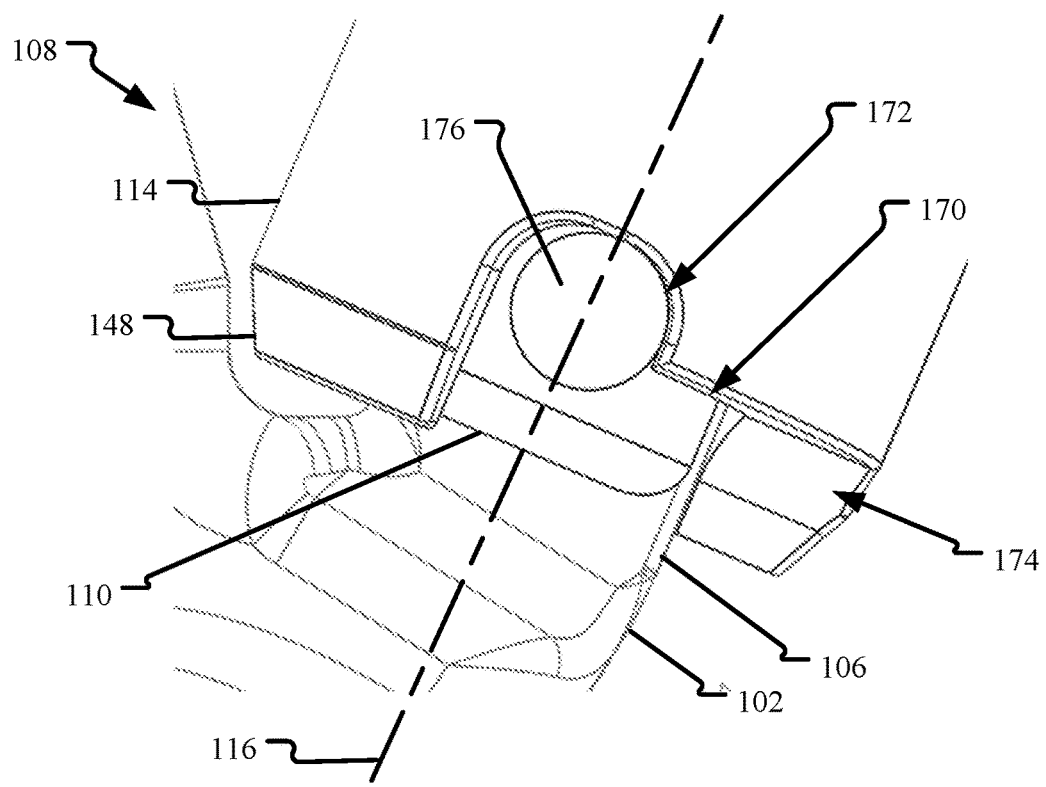
FIG. 13 is another partial side view of the locking gate in the rotational lock position.
Figure 14:
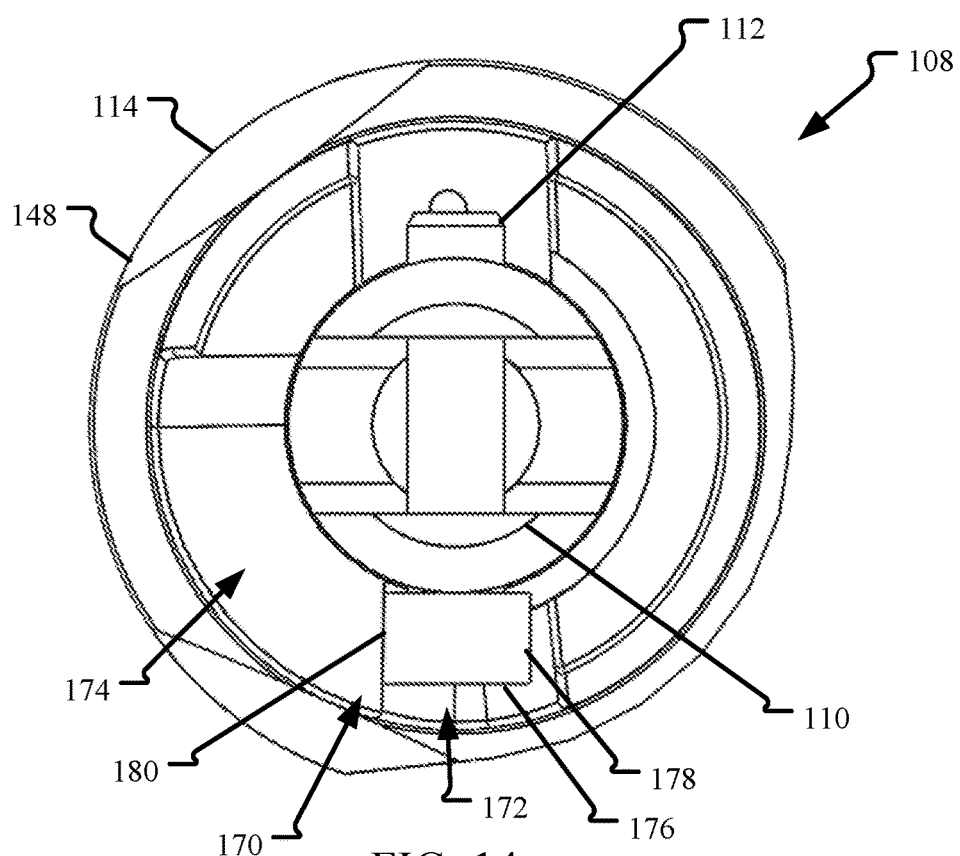
FIG. 14 is another end view of the locking gate in the rotational lock position.

FIG. 13 is another partial side view of the locking gate 108 in a rotational lock position. FIG. 14 is another end view of the locking gate 108 in the rotational lock position. Referring concurrently to FIGS. 13 and 14, certain components are described above, and thus, are not necessarily described further. Similar to FIGS. 11 and 12, the pin head 176 is disposed within the axial portion 172 of the raceway 170, and thus, rotation of the locking collar 114 is prevented. As illustrated in FIGS. 13 and 14, the pin head 176 is contacting a different surface of the raceway 170, but the surface is still tangent to the cylindrical head wall 178 so as to have face-on-face contact and reduce stress distributions.

Figure 15:
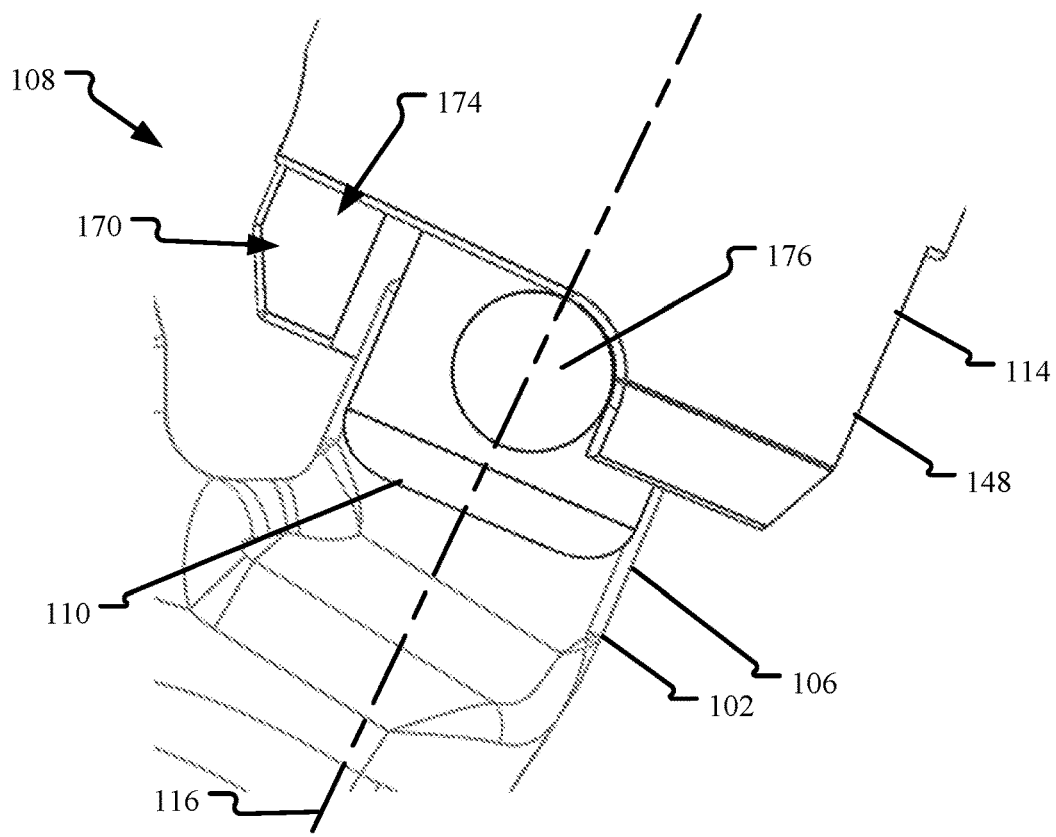
FIG. 15 is a partial side view of the locking gate in a rotational unlock position.
Figure 16:
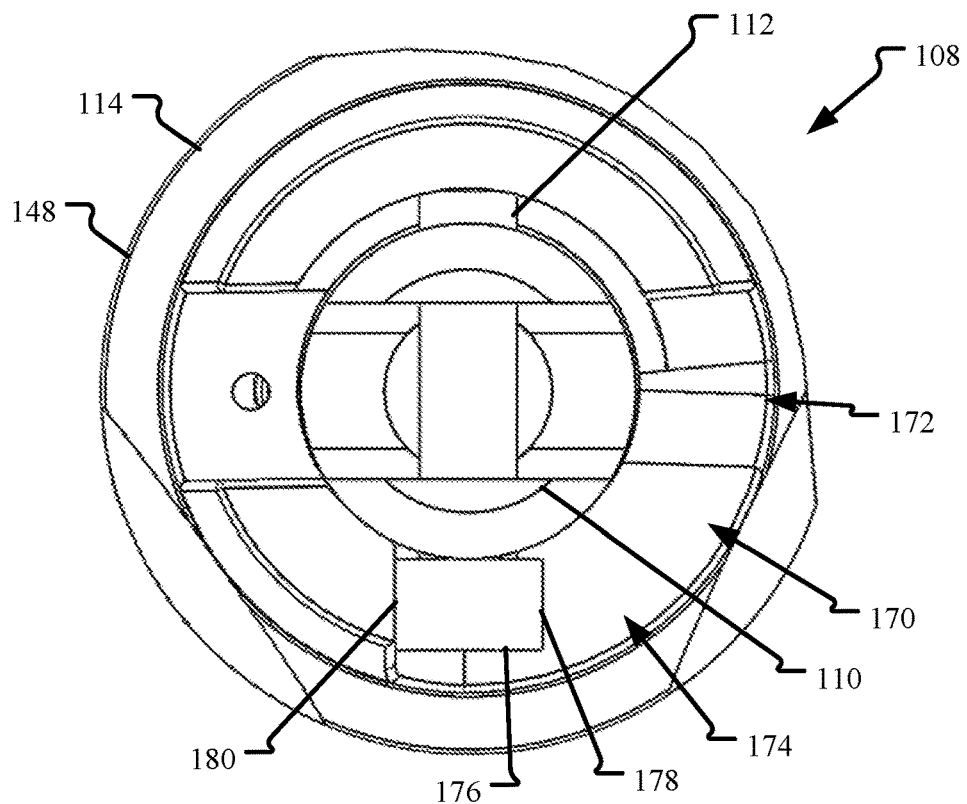
FIG. 16 is an end view of the locking gate in the rotational unlock position.
Figure 17:
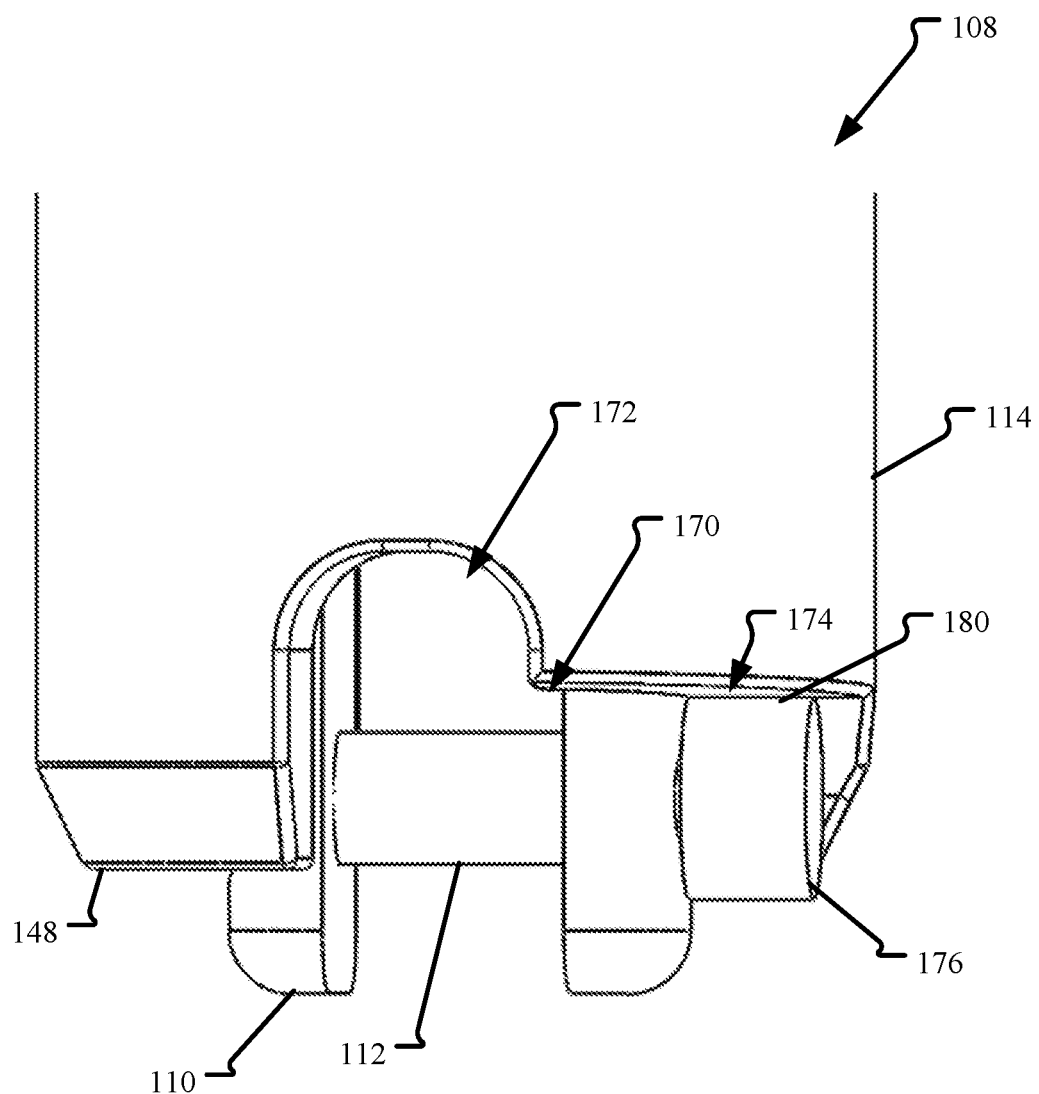
FIG. 17 is a partial perspective view of the locking gate in the rotational unlock position.

FIG. 15 is a partial side view of the locking gate 108 in a rotational unlock position. FIG. 16 is an end view of the locking gate 108 in the rotational unlock position. FIG. 17 is a partial perspective view of the locking gate 108 in the rotational unlock position. Referring concurrently to FIGS. 15-17, certain components are described above, and thus, are not necessarily described further. As described above, the locking collar 114 is translatable T along the longitudinal axis 116 relative to the gate 110. In order to enable rotation of the locking collar 114, the locking collar 114 is translated so that the pin head 176 slides out of the axial portion 172 of the raceway 170, which restricts rotation, and into the circumferential portion 174 of the raceway 170, which allows rotation. As illustrated in FIGS. 15-17, the locking collar 114 has been both translated and rotated so as to unlock the locking gate 108 and the gate 110 can be opened as required or desired. As illustrated in FIGS. 15-17, the pin head 176 is contacting yet another surface of the raceway 170, but the surface is still tangent to the cylindrical head wall 178 so as to have face-on-face contact and reduce stress distributions.

Notwithstanding the appended claims, and in addition to the examples described above, further examples are disclosed in the following numbered clauses:

1. A swivel carabiner including:
   a swivel loop;
   a body rotatably coupled to the swivel loop about a rotational axis, wherein the body includes a spine having a spine axis that intersects the rotational axis at an intersection point disposed within the connection between the swivel loop and the body; and
   a captive eye formed completely within the spine, wherein the body and the captive eye are both rotatable relative to the swivel loop.
2. The swivel carabiner of clause 1, wherein the spine axis extends through the captive eye.
3. The swivel carabiner as in any preceding clause, wherein the captive eye is disposed on the spine at a location proximate the swivel loop.
4. The swivel carabiner as in any preceding clause, further including a bushing disposed between the swivel loop and the body, and wherein the bushing extends in both an axial direction and a radial direction relative to the rotational axis.
5. The swivel carabiner of as in any preceding clause, wherein the captive eye is load rated.
6. A carabiner including:
   a body including a nose end and a hinge end;
   a gate pivotably coupled to the hinge end of the body and configured to engage with the nose end of the body, wherein the gate is pivotable between an open position that disengages the gate from the nose end and a closed position that engages the gate with the nose end, and wherein the gate defines a longitudinal axis; and
   a locking collar coupled to the gate and configured to lock the gate in the closed position, wherein the locking collar includes a first end having a first opening and an opposite second end having a second opening, wherein the locking collar is rotatable about the longitudinal axis, and upon rotation of the locking collar, the first opening clears the nose end before the second opening clears the hinge end, and wherein both the first opening clearing the nose end and the second opening clearing the hinge end occur before the gate is unlocked.

7. The carabiner of clause 6, wherein the first opening has a first circumferential length and the second opening has a second circumferential length, and wherein the first circumferential length is greater than the second circumferential length.

8. The carabiner as in any of clauses 6 or 7, wherein the first opening has a first axial centerline and the second opening has a second axial centerline, and wherein the first axial centerline is circumferentially offset from the second axial centerline.

9. The carabiner as in any of clauses 6-8, further including a pin disposed at the hinge end of the body, and the gate is pivotably coupled to the hinge end via the pin, wherein the locking collar includes a raceway at least partially defined axially on the second end, wherein at least a portion of the pin is slidably received within the raceway, wherein the locking collar is translatable along the longitudinal axis, and wherein translating the locking collar along the longitudinal axis at least partially releases the pin from the raceway allowing rotation of the locking collar.

10. The carabiner of clause 9, wherein a contact area between the pin and the raceway is substantially face-on-face contact.

11. The carabiner as in any of clauses 6-10, further including a swivel loop coupled to the body, wherein the swivel loop and the body are configured to rotate relative to one another.

12. The carabiner of clause 11, further including a flanged bushing disposed at least partially between the swivel loop and the body.

13. The carabiner as in any of clauses 6-12, wherein the body includes a spine disposed opposite of the gate, and wherein a captive eye is formed within the spine.

14. The carabiner as in any of clauses 6-13, wherein the body includes a spine disposed opposite of the gate, and wherein at least a portion of the spine and at least a portion of the locking collar have corresponding contours.

15. A triple-locking carabiner including:
   a body including a nose end and a hinge end;
   a pin disposed at the hinge end of the body;
   a gate pivotably coupled to the hinge end of the body via the pin and configured to engage with the nose end of the body, wherein the gate defines a longitudinal axis; and
   a locking collar coupled to the gate and both rotatable about the longitudinal axis and translatable along the longitudinal axis, wherein the locking collar includes a first end having a first opening and an opposite second end having a second opening, and wherein the first opening is at least partially circumferentially offset from the second end,
   wherein the gate is pivotable between an open position and a closed position, and wherein in a closed position, the gate engages with the nose end and defines a first lock configuration,
   wherein the locking collar is rotatable between a first rotation position and a second rotation position, wherein in the first rotation position, the locking collar engages with the body and defines a second lock configuration, and wherein rotating the locking collar from the first rotation position towards the second rotation position, the second opening clears the hinge end after the first opening clears the nose end, and
   wherein the locking collar is translatable between a first translation position and a second translation position, wherein in the first translation position, the second end of the locking collar engages with the pin preventing rotation of the locking collar, and defines a third lock configuration.

16. The triple-locking carabiner of clause 15, wherein the first opening has a larger circumferential length than the second opening.

17. The triple-locking carabiner as in any of clauses 15 or 16, wherein the gate is biased towards the closed position and the locking collar is biased towards the first rotation position and the first translation position.

18. The triple-locking carabiner as in any of clauses 15-17, wherein the body includes a spine disposed opposite the gate, and wherein an angle between the hinge end and the spine is between approximately 25° and 55°.

19. The triple-locking carabiner as in any of clauses 15-18, wherein the body includes a spine disposed opposite of the gate, and wherein a captive eye is formed within the spine.

20. The triple-locking carabiner as in any of clauses 15-19, further including a swivel loop rotatable coupled to the body.

21. A swivel carabiner including:
   a swivel loop;
   a body rotatably coupled to the swivel loop, wherein the body includes a nose end and a hinge end;
   a pin disposed at the hinge end of the body;
   a gate pivotably coupled to the hinge end of the body via the pin, wherein the gate is pivotable between an open position and a closed position relative to the nose end, and wherein the gate defines a longitudinal axis; and
   a locking collar coupled to the gate, wherein the locking collar includes a first end having a first opening and an opposite second end having a second opening, the first opening at least partially circumferentially offset from the second opening, wherein the locking collar is rotatable about the longitudinal axis, and upon rotation of the locking collar, the first opening clears the body prior to the second opening clearing the body so that before the second opening clears the body, the locking collar prevents the gate from pivoting from the closed position.

22. The swivel carabiner of clause 21, further including a bushing disposed at least partially between the swivel loop and the body, wherein the bushing includes a flange extending substantially orthogonal to a rotational axis of the swivel loop and the body.

23. The swivel carabiner as in any of clauses 21 or 22, wherein the body includes a spine disposed opposite of the gate, and wherein a captive eye is formed within the spine and proximate the swivel.

24. The swivel carabiner as in any of clauses 21-23, wherein the pin includes a head, and the locking collar includes a raceway at least partially defined axially on the second end, wherein the locking collar is translatable along the longitudinal axis, and when the pin is receive within the raceway, the locking collar is prevented from rotating.

25. The swivel carabiner as in any of clauses 21-24, wherein a sliding surface of the raceway is tangential to the pin at all positions of the pin along the raceway.

26. A carabiner including:
   a body including a nose end and a hinge end;
   a gate pivotably coupled to the hinge end of the body; and
   a locking collar rotatably coupled to the gate and configured to lock the gate to the body, wherein the locking collar includes a pair of openings, and wherein upon rotation of the locking collar one of the pair of openings rotationally clears the body before the other of the pair openings rotationally clears the body so as to unlock the gate.

27. The carabiner of clause 26, wherein prior to the other of the pair of openings rotationally clearing the body, the locking collar prevents the gate from opening with respect to the body.

28. The carabiner as in any of clauses 26 or 27, wherein the one of the pair of openings rotationally clears the nose end before the other of the pair of openings rotationally clears the hinge end.

29. The carabiner as in any of clauses 26-28, wherein the pair of openings are disposed on opposite ends of the locking collar, and centerlines of each of the pair of openings are circumferentially offset between approximately 5° and 30°.

30. The carabiner as in any of clauses 26-29, wherein the pair of openings have different circumferential lengths.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A swivel carabiner comprising:
    a swivel loop;
    a body rotatably coupled to the swivel loop about a rotational axis, wherein the body includes a spine having a spine axis that intersects the rotational axis at an intersection point disposed within a connection between the swivel loop and the body; and
    a captive eye formed completely within the spine, wherein the body and the captive eye are both rotatable relative to the swivel loop, and wherein the captive eye is disposed on the spine at a location proximate the swivel loop.

2. The swivel carabiner of claim 1, wherein the spine axis extends through the captive eye.

3. The swivel carabiner of claim 1, further comprising a bushing disposed between the swivel loop and the body, and wherein the bushing extends in both an axial direction and a radial direction relative to the rotational axis.

4. The swivel carabiner of claim 1, wherein the captive eye is load rated.

5. A carabiner comprising:
    a body including a nose end and a hinge end;
    a gate pivotably coupled to the hinge end of the body and configured to engage with the nose end of the body, wherein the gate is pivotable between an open position that disengages the gate from the nose end and a closed position that engages the gate with the nose end, and wherein the gate defines a longitudinal axis; and
    a locking collar coupled to the gate and configured to lock the gate in the closed position, wherein the locking collar includes a first end having a first opening and an opposite second end having a second opening, wherein the locking collar is rotatable about the longitudinal axis, and upon rotation of the locking collar, the first opening clears the nose end before the second opening clears the hinge end, and wherein both the first opening clearing the nose end and the second opening clearing the hinge end occur before the gate is unlocked.

6. The carabiner of claim 5, wherein the first opening has a first circumferential length and the second opening has a second circumferential length, and wherein the first circumferential length is greater than the second circumferential length.

7. The carabiner of claim 5, wherein the first opening has a first axial centerline and the second opening has a second axial centerline, and wherein the first axial centerline is circumferentially offset from the second axial centerline.

8. The carabiner of claim 5, further comprising a pin disposed at the hinge end of the body, and the gate is pivotably coupled to the hinge end via the pin, wherein the locking collar includes a raceway at least partially defined axially on the second end, wherein at least a portion of the pin is slidably received within the raceway, wherein the locking collar is translatable along the longitudinal axis, and wherein translating the locking collar along the longitudinal axis at least partially releases the pin from the raceway allowing rotation of the locking collar.

9. The carabiner of claim 8, wherein a contact area between the pin and the raceway is substantially face-on-face contact.

10. The carabiner of claim 5, further comprising a swivel loop coupled to the body, wherein the swivel loop and the body are configured to rotate relative to one another.

11. The carabiner of claim 10, further comprising a flanged bushing disposed at least partially between the swivel loop and the body.

12. The carabiner of claim 5, wherein the body comprises a spine disposed opposite of the gate, and wherein a captive eye is formed within the spine.

13. The carabiner of claim 5, wherein the body comprises a spine disposed opposite of the gate, and wherein at least a portion of the spine and at least a portion of the locking collar have corresponding contours.

14. A triple-locking carabiner comprising:
    a body including a nose end and a hinge end;
    a pin disposed at the hinge end of the body;
    a gate pivotably coupled to the hinge end of the body via the pin and configured to engage with the nose end of the body, wherein the gate defines a longitudinal axis; and
    a locking collar coupled to the gate and both rotatable about the longitudinal axis and translatable along the longitudinal axis, wherein the locking collar includes a first end having a first opening and an opposite second end having a second opening, and wherein the first opening is at least partially circumferentially offset from the second end,
    wherein the gate is pivotable between an open position and a closed position, and wherein in the closed position, the gate engages with the nose end and defines a first lock configuration,
    wherein the locking collar is rotatable between a first rotation position and a second rotation position, wherein in the first rotation position, the locking collar engages with the body and defines a second lock configuration, and wherein rotating the locking collar from the first rotation position towards the second rotation position, the second opening clears the hinge end after the first opening clears the nose end, and wherein the locking collar is translatable between a first translation position and a second translation position, wherein in the first translation position, the second end of locking collar engages with the pin preventing rotation of the locking collar, and defines a third lock configuration.

15. The triple-locking carabiner of claim 14, wherein the first opening has a larger circumferential length than the second opening.

16. The triple-locking carabiner of claim 14, wherein the gate is biased towards the closed position and the locking collar is biased towards the first rotation position and the first translation position.

17. The triple-locking carabiner of claim 14, wherein the body comprises a spine disposed opposite the gate, and wherein an angle between the hinge end and the spine is between approximately 25° and 55°.

18. The triple-locking carabiner of claim 14, wherein the body comprises a spine disposed opposite of the gate, and wherein a captive eye is formed within the spine.

19. The triple-locking carabiner of claim 14, further comprising a swivel loop rotatable coupled to the body.

* * * * *